United States Patent [19]
Nelson et al.

[11] 3,831,226
[45] Aug. 27, 1974

[54] SEAT BELT SLACK ADJUSTER MECHANISM
[75] Inventors: Nels S. Nelson; Harlow H. Piper, both of Decatur, Ill.
[73] Assignee: Caterpillar Tractor Co., Peoria, Ill.
[22] Filed: Dec. 11, 1972
[21] Appl. No.: 314,151

[52] U.S. Cl.................................. 24/196, 24/171
[51] Int. Cl............................................ A44b 11/10
[58] Field of Search...... 24/196, 194, 126 B, 136 A, 24/171, 195

[56] References Cited
UNITED STATES PATENTS

| | | | |
|---|---|---|---|
| 1,374,691 | 4/1921 | Troop | 24/196 |
| 1,995,439 | 3/1935 | Tompkins | 24/194 |
| 2,349,114 | 5/1944 | Russell | 24/136 A |
| 2,938,254 | 5/1960 | Gaylord | 24/171 |
| 3,204,311 | 9/1965 | Laviano | 24/126 B |
| 3,414,947 | 12/1968 | Holmberg | 24/196 |
| 3,591,900 | 7/1971 | Brown | 24/196 |

*Primary Examiner*—Bernard A. Gelak
*Attorney, Agent, or Firm*—Phillips, Moore, Weissenberger, Lempio & Strabala

[57] ABSTRACT

Apparatus for adjusting the length of a safety belt includes a base into which the end of a first safety belt portion and the end of a second safety belt portion are fed. The first safety belt portion is fed inward, around an elongated cylindrical member slidably mounted to the base and between the elongated cylindrical member and a portion of the base, so that it may be gripped therebetween. A spring is included for urging the elongated member in a gripping direction and into a gripping position relative to that portion of the base. The end of the second safety belt portion is secured to another portion of the base. Adjusting the belt involves slidably moving the elongated member against the force of the spring away from its associated base portion and sliding the first belt portion therebetween, to be gripped in another position.

7 Claims, 3 Drawing Figures

PATENTED AUG 27 1974 3,831,226
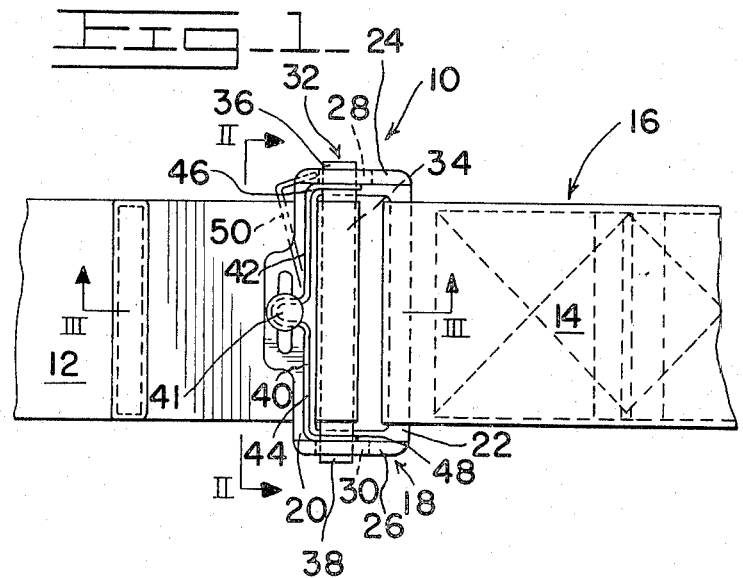
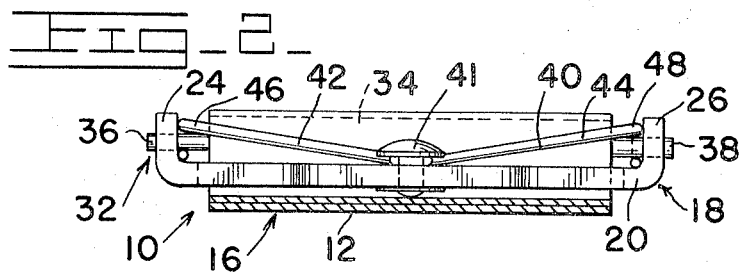
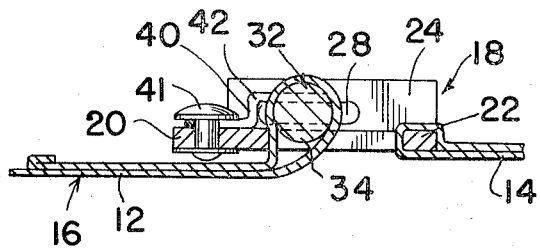

SEAT BELT SLACK ADJUSTER MECHANISM

BACKGROUND OF THE INVENTION

This invention relates to seat belt apparatus, and more particularly, to such an apparatus which allows proper and secure adjustment of seat belt length.

In general, in conventional seat belt vehicle application, retractable reels of the inertia type provide automatic seat belt length adjustment. However, such automatic length adjustment reels, it has been found, tend to progressively tighten the belt, and are therefore unsatisfactory in applications where the operator of the vehicle is subjected to substantially large cyclic motion such as on earth moving vehicles. In the type of seat belt having manual length adjustment means, such adjustment means generally tend to creep and thereby allow lengthening of the belt during use.

U.S. Pat. No. 3,233,296 to Whittingham in general provides means for limiting the turning of a roller about which a safety belt portion is wound. Such means generally include a relatively complex applicable and removable mechanical stop element, and the also relatively complex means associated therewith. Such stop element directly interferes with the turning of the roller.

SUMMARY OF THE INVENTION

It is an object of this invention to provide, in a seat belt system, a positive locking arrangement, to prevent the belt length changes due to the application of cyclic load thereto.

It is a further object of this invention to provide, in a seat belt system, a positive locking arrangement which, while fulfilling the above object, is extremely simple in design, meanwhile being effective in use.

Broadly stated, the invention comprises apparatus for gripping a belt at any one of a variety of places along its length. Such apparatus comprises a body defining a body portion positioned on one side of the belt. An elongated member is slidably associated with the body to be slidably movable relative thereto toward and away from the body portion and positioned on the other side of the belt so that, upon movement of the elongated member toward the body portion, the belt is gripped therebetween. Resilient means are included for resiliently urging the elongated member toward the body portion and biasing the elongated member into a position adjacent the body portion for gripping of the belt between the elongated member and body portion, the elongated member being movable away from the body portion against the resiliency of the resilient means to allow the belt to be moved between the elongated member and body portion relative to the apparatus.

BRIEF DESCRIPTION OF THE DRAWINGS

These and other objects of the invention will become apparent from a study of the following specification and drawings in which:

FIG. 1 is a front elevation of the inventive seat belt adjusting apparatus;

FIG. 2 is a sectional view taken along the line II—II of FIG. 1; and,

FIG. 3 is a sectional view taken along the line III—III of FIG. 1.

DESCRIPTION OF THE PREFERRED EMBODIMENT

FIG. 1 generally shows the apparatus 10 which adjustably interconnects first and second belt portions 12, 14 which are part of the seat belt 16. These seat belt portions 12, 14 extend from opposite sides toward each other, as shown.

The apparatus 10 which interconnects the seat belt portions 12, 14 includes a body 18 which defines generally parallel body portions 20, 22, and generally parallel side portions 24, 26 interconnecting these body portions 20, 22. The side portions 24, 26 define slots 28, 30 respectively. An elongated member 32 is associated with the body 18 and includes a knurled cylindrical portion 34 and end arms or flanges 36, 38, the cylindrical portion 34 being inward of the end flanges 36, 38 thereof. These flanges 36, 38 are slidably disposed in the slots 28, 30 in close relation thereto to allow sliding movement of the elongated member 32 toward the body portion 20 to be adjacent thereto, and away from such body portion 20, the slots 28, 30 actually acting as guide slots for such sliding, meanwhile limiting rotative movement of the elongated member 32 relative to the body 18.

An elongated resilient spring 40 has its mid-point mounted to the mid-point of the body portion 20 by means of the rivet 41, and has extended ends 42, 44 having hooked portions 46, 48 which loop around the flanges 36, 38 respectively inwardly of the side portions 24, 26. The spring 40 in its rest position takes the shape shown at 50. The spring 40, when hooked portions 46, 48 are so positioned to connect to flanges 36, 38, resiliently urges the elongated member 32 toward the body portion 20 and biases the elongated member 32 into a position adjacent body portion 20. Meanwhile, the elongated member 32 is movable away from the body portion 20 against the resiliency of the spring 40.

The belt portion 12 passes between the elongated member 32 and body portion 22, and then around the elongated member 32 and between the elongated member 32 and the body portion 20, and then in a direction generally away from the belt portion 14, as shown in FIG. 3. That is, in the area of the elongated member 32 and the body portion 20, such body portion 20 is positioned on one side of the belt portion 12, and such elongated member 32 is positioned on the other side of the belt portion 12. Thus, upon movement of elongated member 32 under the resiliency of the spring 40, i.e., toward the body portion 20, the belt portion 12 is gripped therebetween. Upon movement of the elongated member 32 away from the body portion 20, against the resiliency of the spring 40, belt portion 12 may be moved between the elongated member 30 and the body portion 20 and relative to the apparatus 10, whereby the belt portion 12 may be gripped at any one of the variety of places along its length.

With the belt portion 14 secured to the second body portion 22, it will be seen that the belt portion 12 may be adjusted relative to the belt portion 14, and thus the overall length of the belt 16 may be adjusted and set. The belt 16 may be used with a conventional buckle assembly (not shown), allowing for easy operator application and removal thereof.

It has been found that, with such apparatus 10, there is no progressive tightening or loosening of the belt 16 over relatively long periods of time. The apparatus 10 may be set and will retain a chosen belt length under applied cyclic loading. In addition, it will be seen that the apparatus 10 is extremely simple in design and operation.

In the claims:

1. Apparatus for gripping a belt at any one of a variety of places along its length, comprising;

a body defining a body portion positioned on one side of the belt;

an elongated member slidably associated with the body to be slidably movable relative thereto toward and away from the body portion and positioned on the other side of the belt, so that, upon movement of the elongated member toward the body portion, the belt is gripped therebetween; and resilient means for resiliently urging the elongated member toward the body portion and biasing the elongated member into a position adjacent the body portion for gripping of the belt between the elongated member and the body portion, the elongated member being movable away from the body portion against the resiliency of the resilient means to allow the belt to be moved between the elongated member and the body portion and relative to the apparatus, and wherein the resilient means comprise an elongated spring mounted at its intermediate portion to the body portion and having extended spaced apart ends connected to the elongated member.

2. The apparatus of claim 1 wherein the body defines first and second side portions defining first and second guide slots respectively, and wherein the elongated member defines first and second arms at the ends thereof and slidably positioned in the first and second guide slots respectively.

3. The apparatus of claim 2 wherein the elongated member comprises a cylindrical portion inwardly of the ends thereof.

4. Apparatus for adjustably interconnecting first and second belt portions extending from opposite directions and generally toward each other, comprising;

a body defining first and second generally parallel body portions and first and second generally parallel side portions interconnecting said body portions;

an elongated member slidably associated with the body to be slidably movable relative thereto toward the first body portion to be adjacent thereto, and away from the first body portion;

resilient means for resiliently urging the elongated member toward the first body portion and biasing the elongated member into a position adjacent the first body portion, the elongated member being movable away from the first body portion against the resiliency of the resilient means;

the first belt portion extending toward the second belt portion, passing between the elongated member and the second body portion, and then between the elongated member and the first body portion, and then in a direction generally away from the second belt portion, the second belt portion being secured to the second body portion whereby, upon movement of the elongated member under the resiliency of the resilient means, the first belt portion is gripped between the elongated member and the first body portion, whereby the elongated member is movable away from the first body portion against the resiliency of the resilient means to allow the first belt portion to be moved between the elongated member and first body portion and relative to the apparatus, whereby the first belt portion may be adjusted relative to the second belt portion, and wherein resilient means comprise and elongated spring mounted to the first body portion and having extended ends connected to the elongated member.

5. The apparatus of claim 4 wherein the first and second side portions define first and second guide slots respectively, and wherein the elongated member defines first and second flanges at the ends thereof and slidably disposed in the first and second guide slots in close relation thereto, to allow such sliding movement of the elongated member relative to the body, meanwhile limiting rotative movement of the elongated member relative to the body.

6. The apparatus of claim 5 wherein the elongated member comprises a cylindrical portion inwardly of the ends thereof.

7. The apparatus of claim 6 wherein the mid-point of the elongated spring is mounted to the mid-point of the first body portion, and wherein the extended ends of the elongated spring comprise hooked portions which loop around the first and second flanges inwardly of the first and second side portions.

* * * * *